United States Patent [19]

Inoue et al.

[11] 4,221,768
[45] Sep. 9, 1980

[54] CATALYST FOR PURIFYING EXHAUST AND WASTE GASES

[75] Inventors: Akira Inoue, Minoo; Takehiko Suzuki, Ibaraki; Koichi Saito; Yukio Aoki, both of Suita; Tetsuji Ono, Amagasaki; Takashi Ohara, Nishinomiya, all of Japan

[73] Assignee: Nippon Shokubai Kagaku Kogyo Co., Ltd., Osaka, Japan

[21] Appl. No.: 901,109

[22] Filed: Apr. 28, 1978

Related U.S. Application Data

[62] Division of Ser. No. 784,463, Apr. 4, 1977, abandoned.

[30] Foreign Application Priority Data

Apr. 8, 1976 [JP] Japan ................................. 51-38712

[51] Int. Cl.$^2$ ............................................. B01D 53/34
[52] U.S. Cl. ................................. 423/239; 423/213.2; 423/213.5; 252/432; 252/435; 252/454; 252/455 R; 252/456; 252/457; 252/458; 252/459; 252/461; 252/462
[58] Field of Search ................. 423/239, 239 A, 213.5, 423/213.2, 351; 252/432, 435, 454, 455 R, 461, 462, 456–459

[56] References Cited

U.S. PATENT DOCUMENTS

| 3,885,019 | 5/1975 | Matsushita et al. | 423/239 A |
|---|---|---|---|
| 3,976,745 | 8/1976 | Nakajima et al. | 423/239 A |
| 4,036,785 | 7/1977 | Saito et al. | 423/239 A |
| 4,043,939 | 8/1977 | Kasaoka | 423/239 A |
| 4,085,193 | 4/1978 | Nakajima et al. | 423/239 A |

OTHER PUBLICATIONS

Shibata et al., "Acid Property of Titania–Zirconia," J. Res. Ind. Catalysis, Hokkaido University, vol. 19, No. 1, 1971, pp. 35–41.

Johnson, "Acidity and Polymerization Activity of Solid Acid Catalysts," Journal of Physical Chemistry, vol. 59, No. 8, Sep. 1955, pp. 827–831.

Itoh et al., "The Acidic Properties of $TiO_2$–$SiO_2$ and its Catalytic Activities for the Amination of Phenol, the Hydration of Ethylene and the Isomeration of Butene," Journal of Catalysis, vol. 35, 1974, pp. 225–231.

*Primary Examiner*—Earl C. Thomas
*Attorney, Agent, or Firm*—Sherman & Shalloway

[57] ABSTRACT

A catalyst for purifying exhaust and waste gases, which consists essentially of
(A) 30 to 99% by weight of at least one catalytic oxide selected from a binary oxide comprising titanium and silicon and a ternary oxide comprising Ti, Zr and Si,
(B) 1 to 70% by weight of a catalytic oxide comprising at least one element selected from the group consisting of V, W, Mo, U, Cu, Fe, Cr, Mn and Ce, and
(C) 0 to 50% by weight of a catalytic oxide comprising at least one element selected from the group consisting of Sn, Zn, Pb, Ti, Zr, Ni, Co, Nb, Ta, P, Br, Bi, Sb, alkali metals, and alkaline earth metals.

15 Claims, No Drawings

CATALYST FOR PURIFYING EXHAUST AND WASTE GASES

This is a division of application Ser. No. 784,463, filed Apr. 4, 1977, and now abandoned.

This invention relates to catalysts for purifying exhaust and waste gases, and more specifically to catalysts capable of converting nitrogen oxide (mainly nitrogen monoxide; to be referred to as $NO_x$), carbon monoxide (CO) and hydrocarbons (lower hydrocarbons and their partially oxidized products; to be referred to as HC) contained in exhaust and waste gases containing oxygen and sulfur oxides (mainly sulfur dioxide; to be referred to as $SO_x$) to non-toxic nitrogen ($N_2$), carbon dioxide ($CO_2$) and water ($H_2O$) respectively with high efficiency, and inhibiting the oxidation of sulfur dioxide ($SO_2$) in the exhaust gases to sulfur trioxide ($SO_3$).

Exhaust gases containing $O_2$, $SO_2$ and NO as main ingredients from boilers using heavy oils or coal and exhaust gases containing $O_2$, $SO_2$, NO, CO and HC from combustion engines, especially automobile engines, using such fuels as gasoline are well known exhaust and waste gases containing oxygen and $SO_x$. In the former, it is $NO_x$ containing NO as a main ingredient that is to be removed, and in the latter, not only $NO_x$ but also CO or HC is to be removed. Accordingly, investigations on catalysts suitable for each of these exhaust gases have been made over many years.

It is an object of this invention to provide catalysts which can be used effectively for a process of purifying these exhaust and waste gases.

In order to remove $NO_x$ from boiler exhaust gases, adsorption methods, absorption methods, and catalytic reducing methods have heretofore been developed. The catalytic reducing methods are suitable for dealing with large quantities of exhaust gases, and of these, a process comprising adding ammonia as a reducing agent to catalytically reduce $NO_x$ selectively to $N_2$ was reported to be superior. The success of this process, however, depends upon whether a catalyst suitable for the composition and properties of an exhaust gas to be treated is available. The requirements of catalysts usable in this method are fourfold. Firstly, they must reduce only $NO_x$ selectively with good efficiency and durability without being affected by oxygen, sulfur compounds, carbon dioxide, carbon monoxide, steam, etc. present in the exhaust gases. Secondly, they must reduce $NO_x$ over a broad temperature range and at as low a temperature as possible below 400° C. since the temperature at the exit of an economizer attached to a boiler system is generally about 400° C. Thirdly, they must sufficiently function at an economically high space velocity. Lastly, they should not lose activity even when soot comprising carbon, iron and various heavy metals contained in the exhaust gases is deposited thereon.

Catalysts comprising noble metals such as platinum or palladium supported on a carrier such as active alumina have been well known as catalysts used in the selective catalytic reducing method using ammonia as a reducing agent. It is known however that the $NO_x$ reducing activity of the catalysts decreases with time because of adverse effects exerted by sulfur compounds, oxygen, carbon dioxide, and steam, particularly the sulfur compounds present in amounts of more than 100 ppm, in the exhaust gases. Our experiments have shown that catalysts obtained by supporting copper oxide on an active alumina carrier known as heavy metal catalysts are poisoned by sulfur compounds present in exhaust gases, particularly by sulfur oxides present in high concentrations. Catalysts of this type, as disclosed, for example, in British Patent Specification No. 1,089,716, are also known as adsorbents for removing sulfur oxides from exhaust gases. Our investigations led to the discovery that in this prior art method, sulfur deposits on the catalyst with time to change copper oxide to copper sulfate, and a part of the active alumina is converted to alumina sulfate, with the result that the catalytic activity is reduced with the passage of time.

Thus, we have found that when treating an exhaust gas containing sulfur compounds in high concentrations, active alumina cannot be directly used as a carrier, but should be in the form which does not permit the deposition of sulfur, or should be such that the deposition of sulfur does not cause changes in the composition of the catalyst.

We have made extensive investigations in order to obtain an improved catalyst for use in the selective catalytic reduction using ammonia as a reducing agent, which catalyst has durability and is capable of reducing $NO_x$ to non-toxic nitrogen with good efficiency at relatively low temperatures and high space velocities without being affected by sulfur compounds, oxygen, carbon dioxide gas, steam, soot, etc. present in a boiler exhaust gas, especially by the sulfur compounds. These investigations finally led to the discovery that a catalyst composed of (A) 30 to 99% by weight of at least one catalytic oxide selected from the group consisting of a binary oxide comprising titanium and silicon and a ternary oxide comprising titanium, zirconium and silicon; (B) 1 to 70% by weight of catalytic oxide comprising at least one element selected from the group consisting of vanadium, tungsten, molybdenum, uranium, copper, iron, chromium, manganese and cerium; and (C) 0 to 50% by weight of a catalytic oxide comprising at least one element selected from the group consisting of tin, zinc, lead, titanium, zirconium, nickel, cobalt, niobium, tantalum, phosphorus, boron, bismuth, antimony, alkali metals and alkaline earth metals is free from the aforesaid defects, and retains superior performance over long periods of time.

The greatest characteristic of the catalyst of this invention is that it contains a binary oxide comprising titanium and silicon (to be abbreviated "$TiO_2$-$SiO_2$") or a ternary oxide comprising titanium, zirconium and silicon (to be abbreviated "$TiO_2$-$ZrO_2$-$SiO_2$"). $TiO_2$-$SiO_2$ and $TiO_2$-$ZrO_2$-$SiO_2$ have by themselves activity on $NO_x$ in exhaust gases, and concurrently act as carriers in the present invention. Moreover, the properties of the binary and ternary oxides also add to the desirable properties of the finished catalyst.

$TiO_2$-$SiO_2$ used in this invention, as is well known from M. Itoh, H. Hattori and K. Tanabe, J. Catal., Vol. 35, pp. 225–231 (1974), is a "solid acid" having a high surface area which exhibits marked acidity that cannot be seen in each of the individual constituent oxides. $TiO_2$-$SiO_2$ is not a mere mixture of titanium oxide and silicon oxide. Its unique properties are ascribable to the formation of a "binary oxide" by titanium and silicon. Likewise, $TiO_2$-$ZrO_2$-$SiO_2$ is not a mere mixture of the individual oxides, but can be regarded as a product resulting from replacing a part of $TiO_2$ in $TiO_2$-$SiO_2$ by $ZrO_2$.

One of the advantages of using $TiO_2$-$SiO_2$, $TiO_2$-$ZrO_2$-$SiO_2$, or both as an ingredient is that the catalyst of the invention exhibits marked acid resistance, and retains its ability to remove $NO_x$ over long periods of time without being affected by $SO_x$ or halogen compounds. This will be demonstrated by Comparative Example 11 to be given hereinbelow which shows a difference in lifetime between the catalysts of this invention and a commercially available catalyst supported on active alumina. The catalyst of the invention also has the advantage of possessing an extremely low ability to oxidize sulfur dioxide ($SO_2$) present in the exhaust gas to sulfur trioxide ($SO_3$) because it contains $TiO_2$-$SiO_2$, $TiO_2$-$ZrO_2$-$SiO_2$, or both as one ingredient. This advantage is of great industrial significance since it leads to the prevention of a rise in dew point temperature caused by the presence of $SO_3$ in the reduced gas and thus to the performance of more economical heat-exchange by a heat-exchanger, and the corrosion of the treating apparatus by $SO_3$ can be prevented. Another advantage is that the catalyst of this invention containing $TiO_2$-$SiO_2$, $TiO_2$-$ZrO_2$-$SiO_2$, or both as one ingredient exhibits a good ability to remove $NO_x$ over a very broad range of temperatures and at high space velocities. It is surprising to note that for example, the catalyst of this invention shows an $NO_x$ removal rate, or $NO_x$ conversion, of as high as more than 95% when $NO_x$ is reduced with ammonia at a reaction temperature of 250° to 400° C. and at a space velocity of 10,000 to 20,000 $hr^{-1}$.

Both $TiO_2$-$SiO_2$ and $TiO_2$-$ZrO_2$-$SiO_2$ have a surface area of at least 5 $m^2/g$, preferably 30 to 450 $m^2/g$. Preferably, $TiO_2$-$SiO_2$ has a composition of 5 to 95 mole% $TiO_2$ and 95 to 5 mole% $SiO_2$. $TiO_2$-$ZrO_2$-$SiO_2$ preferably has a composition consisting of 5 to 95 mole% of $TiO_2$ plus $ZrO_2$, and 95 to 5 mole% of $SiO_2$. Especially preferably, the content of $ZrO_2$ is not more than 30 mole%.

In preparing $TiO_2$-$SiO_2$, the source of titanium can be selected from inorganic titanium compounds such as titanium chloride and titanium sulfate, and organic titanium compounds such as titanium oxalate and tetraisopropyl titanate. The source of silicon can be selected from inorganic silicon compounds such as colloidal silica, water glass (sodium silicate), silicon tetrachloride and silica gel, and organic silicon compounds such as tetraethyl silicate. Some of these raw materials contain traces of impurities and other inclusions, but do not pose any problem unless these impurities and inclusions adversely affect the properties of the resulting $TiO_2$-$SiO_2$.

Preferred methods of preparing $TiO_2$-$SiO_2$ are:

(1) Method comprising impregnating silica gel with titanium tetrachloride, and heat-treating it at 150° to 650° C.

(2) Method comprising mixing titanium tetrachloride with silica sol, adding ammonia to form a precipitate, and washing, drying, and then calcining the precipitate at 150° to 650° C.

(3) Method comprising adding an aqueous solution of sodium silicate to titanium tetrachloride, reacting them with each other to form a precipitate, and washing, drying, and then calcining the precipitate at 150° to 650° C.

(4) Method comprising adding ethyl silicate [$(C_2H_5O)_4Si$] to a water-alcohol solution of titanium tetrachloride to form a precipitate by hydrolysis, and washing, drying, and then calcining the precipitate at 150° to 650° C.

(5) Method comprising adding ammonia to a water-alcohol solution of titanium oxide chloride ($TiOCl_2$) and ethyl silicate to form a precipitate, and washing, drying, and then calcining the precipitate at 150° to 650° C.

Of these, method (2) is most preferred. According to this method, $TiO_2$-$SiO_2$ can be prepared by choosing compounds to the titanium and silicon sources exemplified above so that the molar ratio of $TiO_2$ to $SiO_2$ attains the desired value, preparing an acidic aqueous solution or sol of these compounds each in a concentration of 0.10 to 1.0 g/l calculated as titanium oxide and silicon oxide respectively, maintaining the solution or sol at 10° to 100° C., adding dropwise ammonia as a neutralizing agent with stirring, stirring the mixture at a pH of 2 to 10 for 10 minutes to 3 hours to form a coprecipitated compound comprising titanium and silicon, separating the precipitate by filtration, washing it thoroughly, drying it at 80° to 140° C. for 1 to 10 hours, and then calcining it at 150° to 650° C. for 1 to 10 hours.

$TiO_2$-$ZrO_2$-$SiO_2$ can also be prepared in the same way as in the case of $TiO_2$-$SiO_2$. The source of zirconium can be selected from inorganic zirconium compounds such as zirconium chloride and zirconium sulfate, and organic zirconium compound such as zirconium oxalate. By replacing a part of the titanium compound by such a zirconium compound in the preparation of $TiO_2$-$SiO_2$, $TiO_2$-$ZrO_2$-$SiO_2$ can be easily prepared.

The catalytic oxide (B) (i.e., a catalytic oxide comprising at least one of V, W, Mo, U, Cu, Fe, Cr, Mn and Ce) and the catalytic oxide (C) (i.e., a catalytic oxide comprising at least one of Sn, Zn, Pb, Ti, Zr, Ni, Co, Nb, Ta, P, B, Bi, Sb, alkali metals and alkaline earth metals) which make up the catalyst of this invention together with the catalytic oxide (A) (i.e., $TiO_2$-$SiO_2$, $TiO_2$-$ZrO_2$-$SiO_2$, or both) can be prepared easily in a customary manner using oxides, hydroxide, inorganic acid salt, metal acid salts, organic acid salts, etc., preferably ammonium salts, oxalic acid salts, nitric acid salts, sulfuric acid salts, and halogen compounds, as raw materials.

The term "catalytic oxide", as used in the present application, generically denotes any composition which is obtained by calcining raw materials at high temperatures according to the general concept in the field of catalyst, and includes not only simple oxides, but also oxide complexes or salts.

A catalyst in accordance with this invention in which the catalytic oxide (A) is $TiO_2$-$SiO_2$ and the catalytic oxide (B) is a catalytic oxide comprising vanadium can be prepared, for example, by adding a powder of $TiO_2$-$SiO_2$ obtained by the method described hereinabove to an aqueous solution (or an aqueous solution acidified with oxalic acid or hydrochloric acid) containing a vanadium compound, kneading the mixture well by means of a kneader, molding the mixture into spherical or cylindrical pellets by an extruder, drying the pellets at 120° to 150° C., and calcining the dried pellets at 300° to 650° C., preferably 400° to 550° C., for 1 to 10 hours, preferably 2 to 6 hours in a stream of air. Alternatively, a method can be employed which involves molding a powder of $TiO_2$-$SiO_2$ into spherical or cylindrical pellets, and then supporting a vanadium component on the pellets by impregnation or sintering. The catalyst can also be prepared by directly kneading a powder of $TiO_2$-$SiO_2$ with a powder of vanadium oxide.

A catalyst in accordance with this invention in which the catalytic oxide (A) is $TiO_2$-$SiO_2$, the catalytic oxide (B) is a catalytic oxide comprising vanadium, and the catalytic oxide (C) is a catalytic oxide containing tin can be prepared, for example, by adding a powder of $TiO_2$-$SiO_2$ to a solution containing a vanadium compound and a tin compound, followed by kneading, extrusion-molding, drying and calcination same as in the case of the aforesaid catalyst; or by adding a powder of $TiO_2$-$SiO_2$ and a powder of tin oxide to a solution containing a vanadium compound and treating the mixture in the same way as above; or by directly kneading a powder of $TiO_2$-$SiO_2$, a powder of vanadium oxide and a powder of tin oxide.

The catalyst of this invention can also be supported on a carrier. Examples of the carrier are alumina, silica, silica-alumina, bentonite, diatomaceous earth, silicon carbide, titania, zirconia, magnesia, pumice, and active carbon. There is no particular restriction on the method of supporting. Most commonly, the catalytic oxides (A), (B) and (C) can be supported on a carrier such as granular silicon carbide by calcination.

The catalyst may have any desired shape such as cylinder, sheet, ribbon, corrugated sheet, doughnut, grid, or honeycomb as well as pellets in the aforesaid forms.

There is no particular restriction on the composition of an exhaust gas for which the catalyst of this invention is to be used. Usually, the exhaust gas to be treated by the process of this invention contains 10 to 1,500 ppm of $SO_x$, 1 to 20% by volume of oxygen, 1 to 15% by volume of carbon dioxide gas, 5 to 15% by volume of steam, 10 to 100 mg/N m$^3$ of soot, and 100 to 1,000 ppm of $NO_x$ (mainly NO). Ordinary boiler exhaust gases, exhaust gases from iron ore sintering furnaces, and exhaust gases from glass melting pots which result from such fuels as natural gases, heavy oils, oil shale, oil sand, and coal have a composition within this range. Needless to say, the catalyst of this invention can be used to treat special exhaust gases such as an $NO_x$-containing exhaust gas not containing $SO_x$, and an $NO_x$-containing exhaust gas containing halogen compounds.

The treating conditions vary according to the type and properties of an exhaust gas to be treated. The amount of ammonia ($NH_3$) is preferably 0.5 to 3 parts per part of $NO_x$. For example, since $NO_x$ contained in a boiler exhaust gas consists mostly of NO, the amount of ammonia is especially preferably such that the molar ratio of NO to $NH_3$ is about 1:1, because care must be taken not to discharge the excess of $NH_3$ in the unreacted state. The reaction temperature is 150° to 500° C., preferably 200° to 400° C. The space velocity is 1,000 to 100,000 hr$^{-1}$, preferably 3,000 to 30,000 hr$^{-1}$. There is no particular limitation on the reaction pressure, but the preferred pressure is 0.01 to 10 kg/cm$^2$. The type of reactor used is neither restricted in particular, and reactors of a fixed bed type, moving bed type or fluidized bed type can be used as desired.

The following Examples and Comparative Examples illustrate the present invention more specifically. It should be understood that the invention is in no way limited to these Examples.

EXAMPLE 1

Titanium tetrachloride (11.4 kg) was added dropwise to 80 liters of water under ice cooling with stirring. Then, 4.5 kg of Snowtex-O (a tradename for a product of Nissan Chemical Co., Ltd.; containing 20 to 21% of $SiO_2$ in the sol state) was added. While thoroughly stirring the mixture at about 30° C., ammonia water was gradually added. When the pH of the mixture reached 7, the addition was stopped. The mixture was aged by allowing it to stand for 2 hours. The resulting $TiO_2$-$SiO_2$ gel was filtered, washed with water, dried at 120° C. for 10 hours, and further washed with water, and then calcined at 500° C. for 3 hours. The resulting $TiO_2$-$SiO_2$ powder contained 80 mole% of titanium as $TiO_2$ and 20 mole% of silicon as $SiO_2$ (i.e., the $TiO_2$/$SiO_2$ molar ratio being 4), and had a surface area, measured by the BET method ("BET surface area"), of 220 m$^2$/g. The resulting powder was designated as (TS-1).

Oxalic acid (140 g) was dissolved in 60 ml of water, and 71.5 g of ammonium metavanadate was added and dissolved. To the resulting solution was added 500 g of (TS-1). They were well mixed, and well kneaded by a kneader. The kneading was continued while adding a moderate amount of water. The mixture was then shaped by an extruder into pellets having a diameter of 3 mm and a length of 3 mm. The pellets were dried at 120° C. for 6 hours, and calcined at 450° C. for 6 hours.

The composition of the catalyst obtained was such that the oxide weight ratio, (TS-1)/$V_2O_5$, was 90/10.

EXAMPLE 2

A $TiO_2$-$SiO_2$ powder was prepared in the same way as in Example 1 except that the amounts of the titanium tetrachloride and Snowtex-O were changed to 12.8 kg and 2.3 kg, respectively. The resulting powder had a $TiO_2$/$SiO_2$ molar ratio of 9, and a surface area of 210 m$^2$/g. This powder was designated as (TS-2).

A catalyst having an oxide weight ratio, (TS-2)/$V_2O_5$, of 90/10 was prepared in the same way as in Example 1 using (TS-2).

EXAMPLE 3

A $TiO_2$-$ZrO_2$-$SiO_2$ powder was prepared in the same way as in Example 1 except that the amounts of the titanium tetrachloride and Snowtex-O were changed to 11.4 kg and 0.34 kg, respectively, and 1.2 kg of zirconium oxide chloride ($ZrOCl_2.8H_2O$) was further used. The resulting powder had a $TiO_2$/$ZrO_2$/$SiO_2$ molar ratio of 80/5/15 and a surface area of 230 m$^2$/g. The resulting powder was designated as (TZS-1).

A catalyst having an oxide weight ratio, (TZS-1)/$V_2O_5$, of 90/10 was prepared in the same way as in Example 1 using (TZS-1).

EXAMPLE 4

A $TiO_2$-$SiO_2$ powder was prepared in the same way as in Example 1 except that titanium sulfate and ethyl o-silicate were used as the starting materials. The resulting powder had a $TiO_2$/$SiO_2$ molar ratio of 4, and a surface area of 280 m$^2$/g. The resulting powder was designated as (TS-3).

A catalyst having an oxide weight ratio, (TS-3)/$V_2O_5$, of 90/10 was prepared in the same way as in Example 1 using (TS-3).

EXAMPLES 5 TO 9

$TiO_2$-$SiO_2$ powders were prepared in the same way as in Example 4 except that the $TiO_2$/$SiO_2$ molar ratio was changed as shown in Table 1 below. The compositions and surface areas of the resulting powders are shown in Table 1.

TABLE 1

| | ($TiO_2$-$SiO_2$ powder) | |
|---|---|---|
| Example | $TiO_2$/$SiO_2$ molar ratio | Surface area (m$^2$/g) |
| 5 | 24 | 190 |
| 6 | 9 | 230 |

TABLE 1-continued

| Example | (TiO$_2$-SiO$_2$ powder) TiO$_2$/SiO$_2$ molar ratio | Surface area (m$^2$/g) |
|---|---|---|
| 7 | 1 | 330 |
| 8 | 0.25 | 310 |
| 9 | 0.1 | 270 |

Catalysts having an oxide weight ratio, (TiO$_2$-SiO$_2$ powder)/V$_2$O$_5$, were prepared in the same way as in Example 1 using these TiO$_2$-SiO$_2$ powders.

COMPARATIVE EXAMPLE 1

A TiO$_2$ powder was prepared in the same way as in Example 1 except that the silica sol was not used, and only the titanium tetrachloride was used as a raw material. The resulting TiO$_2$ powder had a surface area of 80 m$^2$/g.

A catalyst having an oxide weight ratio, TiO$_2$/V$_2$O$_5$, of 90/10 was prepared in the same way as in Example 1 using the resulting powder.

COMPARATIVE EXAMPLE 2

An SiO$_2$ powder was prepared in the same way as in Example 1 except that the titanium tetrachloride was not used, and only the ethyl ortho-silicate was used as a raw material. The resulting SiO$_2$ powder had a surface area of 220 m$^2$/g. A catalyst having an oxide weight ratio, SiO$_2$/V$_2$O$_5$, of 90/10 was prepared in the same way as in Example 1 using this SiO$_2$ powder.

COMPARATIVE EXAMPLE 3

A ZrO$_2$ powder was prepared in accordance with the formulation of Example 3 using only zirconium oxide chloride as a raw material. The resulting ZrO$_2$ powder had a surface area of 75 m$^2$/g. A catalyst having an oxide weight ratio, ZrO$_2$/V$_2$O$_5$, of 90/10 was prepared in the same way as in Example 1 using the powder.

COMPARATIVE EXAMPLE 4

The TiO$_2$ powder and the SiO$_2$ powder obtained in Comparative Examples 1 and 2 were mixed well in a TiO$_2$/SiO$_2$ molar ratio of 4. The mixture had a surface area of 110 m$^2$/g. A catalyst having an oxide weight ratio, (TiO$_2$+SiO$_2$)/V$_2$O$_5$, of 90/10 was prepared in the same way as in Example 1 using the mixture.

COMPARATIVE EXAMPLES 5 TO 9

Powdery mixtures having the compositions and surface areas indicated in Table 2 were prepared in the same way as in Comparative Example 4 except that the TiO$_2$/SiO$_2$ molar ratio was changed as indicated in Table 2.

Table 2

| Comparative Example | TiO$_2$/SiO$_2$ molar ratio | Surface area (m$^2$/g) |
|---|---|---|
| 5 | 24 | 90 |
| 6 | 9 | 95 |
| 7 | 1 | 150 |
| 8 | 0.25 | 190 |
| 9 | 0.1 | 210 |

Catalysts having an oxide weight ratio, (TiO$_2$+SiO$_2$)/V$_2$O$_5$, of 90/10 were prepared in the same way as in Example 1 using these mixed powders.

COMPARATIVE EXAMPLE 10

The TiO$_2$, ZrO$_2$ and SiO$_2$ powders obtained in Comparative Examples 1, 2 and 3 were well mixed in a TiO$_2$/ZrO$_2$/SiO$_2$ molar ratio of 80/5/15. The resulting powder mixture had a surface area of 100 m$^2$/g. A catalyst having an oxide weight ratio, (TiO$_2$+ZrO$_2$+SiO$_2$)/V$_2$O$_5$, of 90/10 was prepared in the same way as in Example 3 using the mixed powder.

COMPARATIVE EXAMPLE 11

Copper nitrate (60.8 g) was dissolved in 60 ml of water, and the solution was mixed with 80 g of commercially available active alumina in spherical form (average particle diameter 3 mm; BET surface area 90 m$^2$/g). The mixture was evaporated to dryness, and calcined at 450° C. for 6 hours. The resulting catalyst had an oxide weight ratio, Al$_2$O$_3$/CuO, of 80/20.

EXAMPLE 10

Each of the catalysts obtained in Examples 1 to 9 and Comparative Examples 1 to 11 was tested on a laboratory scale for activity in the following manner. 7.5 ml of the catalyst was packed in a stainless steel reaction tube having an inside diameter of 20 mm and dipped in a molten salt bath. A gas of the following composition simulating a boiler exhaust gas was introduced into the catalyst layer at a flow rate of 2.5 liters/min. (SV 20,000 hr$^{-1}$) while adding 200 ppm of ammonia thereto. The relation between the reaction temperature and the NO$_x$ conversion (%) was measured. The NO$_x$ analyzer used was of chemiluminescent type (by Yanagimoto Co. Ltd., ECL-75 type).

| Composition of the gas | |
|---|---|
| NO | 200 ppm |
| SO$_2$ | 800 ppm |
| O$_2$ | 4% by volume |
| CO$_2$ | 10% by volume |
| H$_2$O | about 10% by volume |
| N$_2$ | remainder |

The results are shown in Table 3.

TABLE 3

| | | (NO$_x$ conversion, %) | | | | |
|---|---|---|---|---|---|---|
| | TiO$_2$/SiO$_2$ | Reaction temperature (°C.) | | | | |
| Catalyst | molar ratio | 200 | 250 | 300 | 350 | 400 |
| Example 1 | 4 | 75 | 85 | 93 | 95 | 96 |
| Example 2 | 9 | 78 | 87 | 95 | 96 | 96 |
| Example 3 | (TZS-1) | 77 | 87 | 95 | 96 | 96 |
| Example 4 | 4 | 76 | 86 | 94 | 95 | 96 |
| Example 5 | 24 | 70 | 81 | 90 | 93 | 93 |
| Example 6 | 9 | 80 | 88 | 95 | 96 | 96 |
| Example 7 | 1 | 64 | 74 | 88 | 90 | 91 |
| Example 8 | 0.25 | 50 | 62 | 77 | 85 | 89 |
| Example 9 | 0.1 | 47 | 58 | 73 | 82 | 88 |
| Comparative Example 1 | — | 60 | 73 | 85 | 88 | 89 |
| Comparative Example 2 | 0 | 35 | 45 | 60 | 64 | 65 |
| Comparative Example 3 | — | 57 | 63 | 79 | 83 | 85 |
| Comparative Example 4 | 4 | 60 | 77 | 87 | 87 | 88 |
| Comparative Example 5 | 24 | 62 | 78 | 86 | 89 | 89 |
| Comparative Example 6 | 9 | 63 | 80 | 88 | 89 | 89 |
| Comparative Example 7 | 1 | 49 | 62 | 76 | 79 | 81 |

TABLE 3-continued

| Catalyst | TiO2/SiO2 molar ratio | Reaction temperature (°C.) 200 | 250 | 300 | 350 | 400 |
|---|---|---|---|---|---|---|
| | | (NOx conversion, %) | | | | |
| Example 8 | 0.25 | 37 | 52 | 66 | 70 | 72 |
| Comparative Example 9 | 0.1 | 33 | 48 | 63 | 66 | 68 |
| Comparative Example 10 | — | 62 | 79 | 88 | 88 | 89 |
| Comparative Example 11 | — | — | 47 | 69 | 76 | 80 |

A comparison of the catalysts of the invention with those of Comparative Examples shown in Table 3 shows that the catalysts of the invention have superior activity even at low temperatures, and can be used over a very broad temperature range.

The strengths of the catalysts obtained in these Examples and Comparative Examples were measured by a Kiya-type hardness tester. The catalysts obtained in these Examples had a strength of more than 4 kg/pellet, but the catalysts obtained in Comparative Examples were weak. Even the catalysts obtained in Comparative Examples 1, 3, 5 and 6 whose activity was relatively good showed a hardness of less than 1 kg/pellet, and therefore, were not usable for practical purposes.

EXAMPLE 11

The relation between the space velocity (SV) and the $NO_x$ conversion (%) at a reaction temperature of 300° C. was determined with regard to each of the catalysts obtained in Examples 1 to 4 and Comparative Examples 1, 2, 4 and 6 in accordance with Example 10. The results are shown in Table 4.

TABLE 4

| Catalyst | (NOx conversion, %) SV (hr−1) at 300° C. | | | | |
|---|---|---|---|---|---|
| | 3,000 | 5,000 | 10,000 | 20,000 | 30,000 |
| Example 1 | 99 | 98 | 97 | 93 | 81 |
| Example 2 | 99 | 99 | 98 | 95 | 85 |
| Example 3 | 99 | 99 | 98 | 95 | 84 |
| Example 4 | 99 | 99 | 98 | 94 | 83 |
| Comparative Example 1 | 97 | 95 | 93 | 85 | 70 |
| Comparative Example 2 | 90 | 87 | 75 | 60 | 41 |
| Comparative Example 4 | 97 | 95 | 93 | 87 | 72 |
| Comparative Example 6 | 97 | 96 | 94 | 88 | 73 |

As can be seen from Table 4, the catalysts of the Examples (invention) show good ability to remove $NO_x$ even at high space velocities.

EXAMPLES 12 to 46

Various catalysts were prepared in accordance with the procedure of Example 1 by using (TS-1) or (TS-2) as catalytic oxide (A) and various catalytic oxides (B) and (C).

Sources of the catalytic oxides (B) and (C) were ammonium salts for vanadium, tungsten, molybdenum and phosphorus, chlorides for titanium, zirconium, niobium and tantalum, and nitrates for the other elements.

The reaction was carried out in accordance with Example 10. The catalyst ingredients and the results obtained are shown in Table 5.

TABLE 5

| Catalyst of Example | Composition (weight ratio) | (NOx conversion, %) Temperature (°C.) | | | |
|---|---|---|---|---|---|
| | | 250 | 300 | 350 | 400 |
| 12 | (TS-1):CuO = 95:5 | 59 | 70 | 93 | 95 |
| 13 | (TS-2):CuO = 90:10 | 60 | 71 | 93 | 95 |
| 14 | (TS-1):Fe2O3 = 95:5 | 59 | 71 | 90 | 94 |
| 15 | (TS-2):Fe2O3 = 90:10 | 60 | 73 | 92 | 95 |
| 16 | (TS-1):WO3 = 90:10 | 20 | 34 | 58 | 90 |
| 17 | (TS-1):MoO3 = 90:10 | 34 | 56 | 79 | 88 |
| 18 | (TS-1):UO3 = 90:10 | 18 | 30 | 52 | 84 |
| 19 | (TS-1):Cr2O3 = 90:10 | 37 | 58 | 81 | 90 |
| 20 | (TS-1):MnO2 = 90:10 | 37 | 58 | 81 | 90 |
| 21 | (TS-1):CeO2 = 90:10 | 58 | 69 | 77 | 89 |
| 22 | (TS-1):V2O5:MoO3 = 87.8:9.8:2.4 | 88 | 93 | 95 | 96 |
| 23 | (TS-1):V2O5:WO3 = 87.8:9.8:2.4 | 87 | 93 | 95 | 96 |
| 24 | (TS-1):V2O5:TiO2 = 85:10:5 | 87 | 94 | 95 | 96 |
| 25 | (TS-1):V2O5:SnO2 = 85:10:5 | 87 | 94 | 95 | 96 |
| 26 | (TS-1):V2O5:ZrO2 = 85:10:5 | 87 | 94 | 95 | 96 |
| 27 | (TS-1):V2O5:CeO2 = 85:10:5 | 87 | 94 | 95 | 96 |
| 28 | (TS-1):V2O5:Nb2O5 = 85:10:5 | 86 | 93 | 95 | 96 |
| 29 | (TS-1):V2O5:MnO2 = 85:10:5 | 87 | 94 | 85 | 86 |
| 30 | (TS-1):V2O5:Ta2O5 = 85:10:5 | 86 | 93 | 95 | 96 |
| 31 | (TS-1):V2O5:Cr2O3 = 85:10:5 | 87 | 94 | 95 | 96 |
| 32 | (TS-1):V2O5:Fe2O3 = 85:10:5 | 87 | 94 | 95 | 96 |
| 33 | (TS-1):V2O5:CuO = 85:10:5 | 86 | 93 | 95 | 96 |
| 34 | (TS-1):V2O5:CoO = 85:10:5 | 87 | 94 | 95 | 96 |
| 35 | (TS-1):V2O5:Bi2O3 = 87.8:9.8:2.4 | 87 | 94 | 95 | 96 |
| 36 | (TS-1):V2O5:Sb2O3 = 87.8:9.8:2.4 | 87 | 94 | 95 | 96 |
| 37 | (TS-1):V2O5:P2O5 = 89.6:10.0:0.4 | 86 | 93 | 95 | 96 |
| 38 | (TS-1):V2O5:B2O3 = 89.6:10.0:0.4 | 86 | 93 | 95 | 96 |
| 39 | (TS-1):V2O5:Na2O = 89.6:10.0:0.4 | 86 | 93 | 95 | 96 |
| 40 | (TS-1):V2O5:K2O = 89.6:10.0:0.4 | 86 | 93 | 95 | 96 |
| 41 | (TS-1):V2O5:Cs2O = 89.6:10.0:0.4 | 86 | 93 | 95 | 96 |
| 42 | (TS-1):V2O5:MgO = 89.6:10.0:0.4 | 87 | 94 | 95 | 96 |
| 43 | (TS-1):CuO:NiO = 90:5:5 | 64 | 73 | 94 | 96 |
| 44 | (TS-1):CuO:Cr2O3 = 90:5:5 | 61 | 72 | 94 | 96 |
| 45 | (TS-1):CuO:ZnO = 90:5:5 | 60 | 71 | 94 | 96 |
| 46 | (TS-1):CuO:Fe2O3 = 90:5:5 | 64 | 73 | 94 | 96 |

EXAMPLE 47

Catalysts consisting of (TS-1) as catalytic oxide (A), and $V_2O_5$, CuO or $Fe_2O_3$ as catalytic oxide (B) in a proportion of 0, 1, 10, 30, 50, 70, and 90% by weight respectively were prepared in accordance with Example 1. These catalysts were subjected to the same activity test as in Example 11, and the results shown in Table 6 were obtained.

From Table 6, it can be seen that the suitable content of catalytic oxide (B) is 1 to 70% by weight.

TABLE 6

| Catalyst composition | (NOx conversion, %) Proportion of catalytic oxide (% by weight) | | | | | | |
|---|---|---|---|---|---|---|---|
| | 0 | 1 | 5 | 10 | 30 | 50 | 70 | 90 |
| (TS-1)/V2O5 | 22 | 78 | 93 | 93 | 90 | 88 | 67 | 20 |
| (TS-1)/CuO | 22 | 55 | 70 | 71 | 68 | 65 | 64 | 15 |
| (TS-1)/Fe2O3 | 22 | 57 | 71 | 73 | 68 | 63 | 59 | 11 |

EXAMPLE 48

A durability test on catalyst was carried out using a boiler exhaust gas. The catalysts tested were those obtained in Examples 1, 2, 3, 12, and 14 and Comparative Examples 1, 4, 6, and 11, but were in the form of pellets having a diameter of 8 mm and a length of 8 mm in view of the flow rate of the gas. The reactor used had a diameter of about 84 mm, and the amount of each catalyst packed was about 1 liter. The exhaust gas was first subjected to an electrostatic precipitator to remove about 90% of soot contained in it, and then introduced into the catalyst layer while adding ammonia. The average composition of the exhaust gas consisted of 200 ppm of $NO_x$, 1,400 ppm of $SO_x$, 7% by volume of $O_2$, 12% by volume of $CO_2$, 14% by volume of $H_2O$, and the remainder being $N_2$. The amount of ammonia added was 200 ppm.

The space velocity was 20,000 $hr^{-1}$, and the reaction temperature was 310° C. for the catalysts of Examples 1, 2 and 3 and Comparative Examples 1, 4 and 6, and 350° C. for the catalysts of Examples 12 and 14 and Comparative Example 11.

The results shown in Table 7 demonstrate that the catalysts of the Examples (the invention) have superior durability.

TABLE 7

| Catalyst | ($NO_x$ conversion, %) Time that elapsed (hours) | | | | |
|---|---|---|---|---|---|
| | Start | 500 | 1000 | 2000 | 3000 |
| Example 1 | 93 | 92 | 92 | 92 | 92 |
| Example 2 | 94 | 93 | 93 | 93 | 93 |
| Example 3 | 94 | 93 | 93 | 93 | 93 |
| Example 12 | 93 | 92 | 91 | 91 | 91 |
| Example 14 | 90 | 89 | 88 | 88 | 88 |
| Comparative Example 1 | 85 | 81 | 73 | 65 | 53 |
| Comparative Example 4 | 87 | 84 | 78 | 70 | 61 |
| Comparative Example 6 | 88 | 84 | 76 | 67 | 57 |
| Comparative Example 11 | 76 | 33 | — | — | — |

EXAMPLE 49

The catalysts of Examples 1, 2, 3, 12, and 14 and Comparative Examples 1, 4, 6, and 11 were tested for their ability to oxidize $SO_2$.

The same gas as used in Example 10 except containing no $NH_3$ was introduced into the catalyst layer at a reaction temperature of 350° C. and a space velocity of 5,000 $hr^{-1}$. The concentration of $SO_2$ in the incoming gas and the concentration of $SO_2$ in the outgoing gas were measured, and the conversion of $SO_2$ was calculated from the difference between them. The results are shown in Table 8.

TABLE 8

| Catalyst | Conversion of $SO_2$ (%) |
|---|---|
| Example 1 | 3 |
| Example 2 | 5 |
| Example 3 | 5 |
| Example 12 | 8 |
| Example 14 | 7 |
| Comparative Example 1 | 21 |
| Comparative Example 4 | 20 |
| Comparative Example 6 | 20 |
| Comparative Example 11 | 35 |

The results shown in Table 8 demonstrate that the catalysts of the Examples (the invention) permit a very low conversion of $SO_2$, namely, they have a very low ability to oxidize $SO_2$ to $SO_3$.

EXAMPLE 50

A $TiO_2$-$SiO_2$ powder was prepared in the same way as in Example 1 except that 19.2 liters of an $H_2SO_4$-acidified aqueous solution of titanyl sulfate [250 g/l of $TiOSO_4$ (calculated as $TiO_2$); total $H_2SO_4$ 1200 g/l] and 4.5 kg of Snowtex-O were used. The resulting powder had a $TiO_2/SiO_2$ molar ratio of 4 and a surface area of 220 $m^2$/g.

Using this powder, a catalyst having an oxide weight ratio, ($TiO_2$-$SiO_2$ powder)/$V_2O_5$, of 90/10 was prepared in the same way as in Example 1. The resulting catalyst showed a catalytic performance equivalent to the catalyst of Example 1.

EXAMPLE 51

In the procedure of Example 1, sheets having a thickness of 5 mm, a width of 160 mm and a length of 450 mm were produced by extrusion molding instead of producing the pellets. The sheets were placed in formers and pressed at a pressure of 60 kg/$cm^2$, followed by drying and calcining to yield catalyst sheets having the same composition as the catalyst obtained in Example 1.

The durability of these catalyst sheets was tested in the following manner.

Sixty-four catalyst sheets were fixed in a box-like reactor having a size of 160 mm in lateral side, 160 mm in vertical side and 1800 mm in length at equal intervals in parallel to the flow of gas. The same exhaust gas as used in Example 48 was introduced into the reactor without subjecting it beforehand to an electrostatic precipitator (therefore, the exhaust gas had a soot content of 500 mg/$Nm^3$). The exhaust gas had been preheated so that its temperature at the inlet of the reactor became 330° C., and fed at a rate of 460 $Nm^3$/hr.

The results of the durability test are shown in Table 9.

TABLE 9

| Time that elapsed (hours) | $NO_x$ conversion (%) |
|---|---|
| Start | 95 |
| 500 | 94 |
| 1000 | 94 |
| 2000 | 94 |
| 3000 | 94 |

EXAMPLE 52

In the procedure of Example 1, cylindrical catalysts having an outside diameter of 20 mm, a length of 450 mm and a thickness of 5 mm were produced by extrusion molding instead of producing the pellets, followed by drying and calcining. The catalysts had the same compositions as the catalyst obtained in Example 1.

The durability of these cylindrical catalysts was tested in the following manner.

256 cylindrical catalysts were fixed in a box-like reactor having a size of 160 mm in lateral side, 160 mm in vertical side and 1800 mm in length in parallel to the flow of gas. Ammonia was added to an exhaust gas from a boiler where coal was used as a fuel. The gaseous mixture was introduced into the reactor. The exhaust gas consisted of 250 to 300 ppm of $NO_x$, 800 to 1200 ppm of $SO_x$, 3 to 4% by weight of oxygen, 10 to 12% by volume of carbon dioxide gas, 10 to 14% by volume of steam, and the remainder being nitrogen. Ammonia was added to the exhaust gas so that the $NH_3$/$NO_x$ molar ratio became 1. The exhaust gas contained 10 to 20 g/Nm³ of soot. Furthermore, the exhaust gas had been preheated so that its temperature at the inlet of the reactor became 330° C., and fed at a rate of 460 Nm³/hr.

The results of the durability test are shown in Table 10.

EXAMPLE 53

A cordierite honeycomb structure having a size of 160 mm in lateral side, 160 mm in vertical side and 450 mm in length and an intercell distance of 5 mm was coated with the same catalyst-forming materials as used in Example 1 so that their amounts deposited were 20% by weight, then dried, and calcined to form a honeycomb catalyst having the same composition as the catalyst of Example 1.

Four such honecomb catalysts were fixed in the same box-like reactor as used in Example 51, and tested for durability in the same way as in Example 51. The results are shown in Table 10.

TABLE 10

| | (NO$_x$ conversion, %) | | | | |
|---|---|---|---|---|---|
| | Time that elapsed (hours) | | | | |
| Catalyst | Start | 500 | 1000 | 2000 | 3000 |
| Example 52 | 94 | 93 | 93 | 93 | 93 |
| Example 53 | 95 | 94 | 94 | 94 | 94 |

What we claim is:

1. A process for the selective removal of nitrogen oxides from oxides from exhaust and waste gases containing nitrogen oxides, which comprises contacting the exhaust and waste gases with ammonia at a temperature of from about 150° C. to about 500° C. in the presence of a catalyst which consists essentially of
    (A) 30 to 99% by weight of at least one solid acid selected from the group consisting of a binary oxide consisting of titanium, silicon and oxygen and a ternary oxide consisting of titanium, zirconium, silicon and oxygen
    (B) 1 to 70% by weight of a catalytic oxide comprising at least one element selected from the group consisting of vanadium, tungsten, molybdenum, uranium, copper, iron, chromium, manganese and cerium, and
    (C) 0 to 50% by weight of a catalytic oxide comprising at least one element selected from the group consisting of tin, zinc, lead, titanium, zirconium, nickel, cobalt, niobium, tantalum, phosphorus, boron, bismuth, antimony, alkali metals, and alkaline earth metals.

2. The process of claim 1 wherein the solid acid has a surface area of at least 5 m²/g.

3. The process of claim 1 wherein the solid acid has a surface area of 30 to 450 m²/g.

4. The process of claim 1 wherein the solid acid is a binary oxide which consists of 5 to 95 mole% of titanium as TiO$_2$ and 95 to 5 mole% of silicon as SiO$_2$.

5. The process of claim 1 wherein the solid acid is a ternary oxide which consists of 5 to 95 mole% of titanium plus zirconium as TiO$_2$-ZrO$_2$, and 95 to 5 mole% of silicon as SiO$_2$.

6. The process of claim 5 in which the ternary oxide has a ZrO$_2$ content of not more than 30 mole%.

7. The process of claim 1 wherein the temperature is in the range of 200° to 400° C.

8. The process of claim 1 wherein the exhaust and waste gases are contacted with the catalyst at a space velocity of 1,000 to 100,000 hr$^{-1}$.

9. The process of claim 8 wherein the space velocity is in the range of 3,000 to 30,000 hr$^{-1}$.

10. The process of claim 1 wherein the ammonia is added in an amount of 0.5 to 3 mol to 1 mol of the nitrogen oxides.

11. The process of claim 1 wherein the exhaust and waste gases contain sulfur oxides.

12. The process of claim 1 wherein the exhaust and waste gases comprise 10 to 1,500 ppm of sulfur oxides, 1 to 20% by volume of oxygen, 1 to 15% by volume of carbon dioxide gas, 5 to 15% by volume of steam, 10 to 100 mg/Nm³ of soot, and 100 to 1,000 ppm of nitrogen oxides.

13. The process of claim 1 wherein the pressure is from 0.01 to 10 kg/cm².

14. The process of claim 1 wherein the solid acid (A) is a mixture of the binary oxide and ternary oxide.

15. The process of claim 14 wherein the binary oxide consists of 5 to 95 mole% of titanium as TiO$_2$ and 95 to 5 mole% of silicon as SiO$_2$ and the ternary oxide consists of 5 to 95 mole% of titanium plus zirconium as TiO$_2$-ZrO$_2$ and 95 to 5 mole% of silicon as SiO$_2$.

* * * * *